US010168935B2

(12) United States Patent
Hooton

(10) Patent No.: US 10,168,935 B2
(45) Date of Patent: *Jan. 1, 2019

(54) MAINTAINING ACCESS TIMES IN STORAGE SYSTEMS EMPLOYING POWER SAVING TECHNIQUES

(71) Applicant: International Business Machines Corporation, Armonk, NY (US)

(72) Inventor: Paul Hooton, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 15/398,967

(22) Filed: Jan. 5, 2017

(65) Prior Publication Data

US 2017/0115918 A1 Apr. 27, 2017

Related U.S. Application Data

(63) Continuation of application No. 12/769,699, filed on Apr. 29, 2010, now Pat. No. 9,619,163.

(30) Foreign Application Priority Data

Jun. 26, 2009 (EP) ..................................... 09163918

(51) Int. Cl.
*G06F 12/02* (2006.01)
*G06F 3/06* (2006.01)
(Continued)

(52) U.S. Cl.
CPC .......... *G06F 3/0625* (2013.01); *G06F 1/3221* (2013.01); *G06F 3/0617* (2013.01);
(Continued)

(58) Field of Classification Search
CPC .... G06F 3/0625; G06F 1/3221; G06F 3/0659; G06F 3/0689
See application file for complete search history.

(56) References Cited

U.S. PATENT DOCUMENTS 6,892,271 B2 * 5/2005 Piccirillo ............ G06F 11/1666
710/302
7,035,972 B2 4/2006 Guha et al.
(Continued)

OTHER PUBLICATIONS

Non Final Office Action for U.S. Appl. No. 12/769,699 dated May 10, 2012.
(Continued)

*Primary Examiner* — Edward J Dudek, Jr.
*Assistant Examiner* — Ryan Dare
(74) *Attorney, Agent, or Firm* — Daniel Simek; Hoffman Warnick LLC

(57) ABSTRACT

An apparatus, method, and computer program for maintaining access times in a data processing system, wherein the data processing system comprises a plurality of storage devices, the apparatus including: a receive component, for receiving a command or an availability message, wherein an availability message indicates whether the storage device is available; an evaluate component for evaluating a plurality of first relationships between the storage devices and a plurality of first values, wherein each of the first values indicates whether a related storage device is a redundant; a send component, for sending a power message to one or more of the storage devices; and an update component for updating a second relationship between the redundant storage device and a plurality of second values, wherein each of the second values indicates whether a related redundant storage device is available.

7 Claims, 8 Drawing Sheets

(51) Int. Cl.
*G06F 1/32* (2006.01)
*G06F 11/10* (2006.01)
(52) U.S. Cl.
CPC .......... *G06F 3/0659* (2013.01); *G06F 3/0689* (2013.01); *G06F 11/1076* (2013.01); *Y02D 10/154* (2018.01)

(56) References Cited

U.S. PATENT DOCUMENTS

| | | |
|---|---|---|
| 7,210,005 B2 | 4/2007 | Guha et al. |
| 7,987,318 B2 | 7/2011 | Hetzler et al. |
| 2003/0070113 A1 | 4/2003 | Ferguson et al. |
| 2006/0064550 A1 | 3/2006 | Katsuragi et al. |
| 2007/0220316 A1 | 9/2007 | Guha et al. |
| 2010/0023847 A1* | 1/2010 | Morita ................ G06F 11/1076 714/801 |

OTHER PUBLICATIONS

Non Final Office Action for U.S. Appl. No. 12/769,699 dated Jun. 20, 2014.
Final Office Action for U.S. Appl. No. 12/769,699 dated Nov. 6, 2014.
Non Final Office Action for U.S. Appl. No. 12/769,699 dated Nov. 19, 2015.
Final Office Action for U.S. Appl. No. 12/769,699 dated Mar. 28, 2016.
Notice of Allowance and Fee(s) Due for U.S. Appl. No. 12/769,699 dated Dec. 2, 2016.

\* cited by examiner

| | 204 | 206 | 208 |
|---|---|---|---|
| DEVICE | ARRAY NUMBER | RAID TYPE | INFORMATION |
| id 1 | array 1 | R4 | D |
| id 2 | array 1 | R4 | D |
| id 3 | array 1 | R4 | D |
| id 4 | array 1 | R1 | P |
| id 5 | array 2 | R1 | D |
| id 6 | array 2 | R5 | P |
| id 7 | array 3 | R5 | D / P |
| id 8 | array 3 | R5 | D / P |
| id 9 | array 3 | R5 | D / P |

*FIGURE 2*

*PRIOR ART*

| DEVICE | AVAILABILITY |
|---|---|
| id 1 | Y |
| id 2 | Y |
| id 3 | Y |
| id 4 | N |
| id 5 | Y |
| id 6 | N |
| id 7 | Y |
| id 8 | N |
| id 9 | Y |

*FIGURE 3*

*PRIOR ART*

MAINTAINING ACCESS TIMES IN STORAGE SYSTEMS EMPLOYING POWER SAVING TECHNIQUES

TECHNICAL FIELD

The invention relates to the field of storage systems. In particular, the invention relates to an apparatus, method and computer program for maintaining access times in storage systems employing power saving techniques.

RELATED ART

Within a storage subsystem the usage pattern of the storage devices may vary. Some storage devices may be configured to hold on-line data that must be available for immediate access (such as databases, file systems, etc). Other storage devices might hold data that is rarely accessed (for example, archive data or data that is rarely used).

Modern storage systems employ various techniques to save power. One such technique is through the use of Massive Array of Idle Disks (MAID) methods. A MAID storage subsystem is one that offers the facility for disk storage devices to be spun down when not in use. Typically, the only disk storage devices that are spun down are those not holding data that require immediate response to access requests. If data on a spun down disk needs to be accessed, there is a delay in the access time, that may be anywhere from 10 to 60 seconds (typically 30 seconds) as the disk storage device is restarted. Some MAID implementations spin down the storage device fully, whereas some just park the heads, so actual response time when accessing MAID data will vary. MAID is typically implemented within large storage subsystems that hold multiple storage devices.

Redundant Array of Inexpensive Disks (RAID) technology is pervasive in the storage industry. RAID provides a method whereby storage reliability, performance, capacity and availability may be built into a storage subsystem using low cost disks using disk arrays with inbuilt redundancy. RAID may come in many forms depending on the relative trade off requirements of reliability, performance, capacity and availability of data. In RAID arrays, redundant data is created on portions (stripes) of each disk. The data on any failing disk may be recovered from the redundant data on other disks of the array.

Examples of typical RAID levels are RAID 0, RAID 1, RAID 4, RAID 5 and RAID 10.

In RAID 0, data is striped over a number (n) of disks. RAID 0 provides performance and availability advantages, as the n disks may be accessed simultaneously. However, if a disk fails, all data is lost.

In RAID 1, data is duplicated across every disk in the array. RAID 1 provides reliability advantages, as data may be recovered in the event of a disk failure. However, overall capacity is reduced due to data duplication.

In a RAID 4 and in a RAID 5 array of (n) member storage device, the first (m) bytes of the array data (where (m) is the stripe length) are held on a first storage device, the second (m) bytes is held on the second storage device, and so on up to and including the $(n-1)^{th}$ storage device. The $(n)^{th}$ storage device holds the parity data, that is, the exclusive-OR (XOR) of the stripe data held on the other storage devices of the array. If one storage device fails, data may be reconstructed from the remaining storage devices using the parity data. Overall capacity is reduced, due to the requirement to preserve storage device space for parity values. In a RAID 4 array, parity data is stored on a dedicated parity storage device. In contrast, in a RAID 5 array, parity data is rotated around the storage devices that make up the array.

RAID 10 is a combination of RAID 0 and RAID 1. Data is striped over (n) storage devices of the array and that data is mirrored over a further (n) storage devices.

Therefore, (2n) storage devices make up an array. Loss of one or more storage devices is tolerated as the data may be recovered from the surviving mirror storage device. If two storage devices that are a mirrored pair are lost, data access is lost. However, overall capacity is reduced due to data duplication.

Typically, MAID and RAID techniques are not combined, as the delay in access times in a MAID subsystem conflict with availability requirements of RAID systems.

SUMMARY OF THE INVENTION

Viewed from a first aspect, the present invention provides a storage management apparatus for maintaining access times in a data processing system, wherein the data processing system comprises a plurality of storage devices, the apparatus comprising: a receive component for receiving a command; an evaluate component, responsive to receiving the command, for evaluating a plurality of first relationships between the plurality of storage devices and a plurality of first values, wherein each of the first values indicates whether a related storage device is a redundant storage device; a send component for sending a power message to one or more of the plurality of storage devices, in response to the evaluate component determining that one or more of the plurality of storage devices is a redundant storage device; the receive component, further receiving an availability message, wherein the availability message indicates whether the redundant storage device is available; and an update component, in response to the receive component receiving the availability message, for updating a second relationship between the redundant storage device and a plurality of second values, wherein each of the second values indicates whether a related redundant storage device is available.

The present invention provides an apparatus, method and computer program to achieve power savings of spinning down storage devices whilst maintaining access times in the event of access to those storage devices by using the redundancy and recovery procedures of Redundant Array of Inexpensive Disks (RAID) storage subsystems. One advantage of the solution over the current known solutions is that response times to data on storage devices that are spun down is in the order of milliseconds rather than in the order of seconds.

By combining the RAID redundancy techniques above and choosing to spin down selected storage devices, depending on the RAID level, power savings may still be achieved, whilst still maintaining millisecond response times for reads and writes. Dependent on the type of RAID arrays, a management apparatus may select which storage device may be powered down yet still enable access to the RAID data through use of the redundancy offered by the RAID array. In an embodiment, the redundancy and the availability of a storage device is used to determine whether the storage device may be powered down or up.

In an embodiment, the present invention provides an apparatus wherein the power message indicates a power down command. Alternatively, in another embodiment, the present invention provides an apparatus wherein the power message indicates a power up command.

In an embodiment, the present invention provides an apparatus, wherein the command comprises a read command, wherein the evaluate component, in response to the receive component receiving a read command, evaluates a plurality of the second values associated with the plurality of storage devices, and wherein the apparatus further comprises: a read component, in response to the evaluate component determining that one or more of the plurality of storage devices is not available, for reading data from the plurality of storage devices; and a reconstruct component for reconstructing data from the plurality of storage devices.

The present invention provides reads from a storage array without having to power up a storage device that has been powered down for power saving operations. In an embodiment, the powered down storage device is powered up after a read, so that subsequent reads may take place. If no subsequent read is performed, the redundant storage device may be powered down.

In an embodiment, the present invention provides an apparatus wherein the command comprises a write command, wherein the evaluate component, in response to the receive component receiving a write command, determines a plurality of the second values associated with the plurality of storage devices, and wherein the apparatus further comprises a write component, in response to the evaluate component determining that one or more of the plurality of storage devices is not available, for writing data to the plurality of storage devices. To this extent, the present invention provides writes to a storage array without having to power up a storage device that has been powered down for power saving operations. In an embodiment, the powered down storage device is powered up after a write, so data may be written to a storage device that had been powered down, and so that subsequent writes may take place. If no subsequent write is performed, the redundant storage device may be powered down.

Viewed from a second aspect, the present invention provides a method for maintaining access times in a data processing system, wherein the data processing system comprises a plurality of storage devices, the method comprising: receiving a command; evaluating a plurality of first relationships between the plurality of storage devices and a plurality of first values, wherein each of the first values indicates whether a related storage device is a redundant storage device; sending a power message to one or more of the plurality of storage devices, in response to the evaluate component determining that one or more of the plurality of storage devices is a redundant storage device; receiving an availability message, wherein an availability message indicates whether the redundant storage device is available; and, in response to the receive component receiving the availability message, updating a second relationship between the redundant storage device and a plurality of second values, wherein each of the second values indicates whether a related redundant storage device is available.

In an embodiment, the present invention provides a method wherein the power message indicates a power down command. Alternatively, the present invention provides a method wherein the power message indicates a power up command.

In an embodiment, the present invention provides a method wherein the command comprises a read command, and wherein the method further comprises: in response to the receive component receiving a read command, evaluating a plurality of the second values associated with the plurality of storage devices; in response to the evaluate component determining that one or more of the plurality of storage devices is not available, reading data from the plurality of storage devices; and, reconstructing data from the plurality of storage devices.

In an embodiment, the present invention provides a method wherein the command comprises a write command, wherein the method further comprises: in response to the receive component receiving a write command, determining a plurality of the second values associated with the plurality of storage devices; and, in response to the evaluate component determining that one or more of the plurality of storage devices is not available, writing data to the plurality of storage devices.

Viewed from a third aspect, the present invention provides a computer program loadable into the internal memory of a digital computer, comprising software code portions for performing, when the program is run on a computer, the present invention.

BRIEF DESCRIPTION OF THE DRAWINGS

The present invention will now be described, by way of example only, with reference to various illustrative embodiments.

FIG. 2 is an exemplary RAID table depicting information used in a data processing system, in accordance with the prior art, and in which an embodiment of the present invention may be implemented.

FIG. 3 is an exemplary availability table depicting further information used in a data processing system, in accordance with the prior art, and in which an embodiment of the present invention may be implemented.

DETAILED DESCRIPTION OF THE INVENTION

Redundant data may be held in different forms, but for the purpose of explaining the present invention, a RAID 4 array will be used as an example embodiment. However, it will be appreciated that the invention is applicable to any RAID version, including future versions, which use a redundancy scheme similar to that described above.

Figure 1:
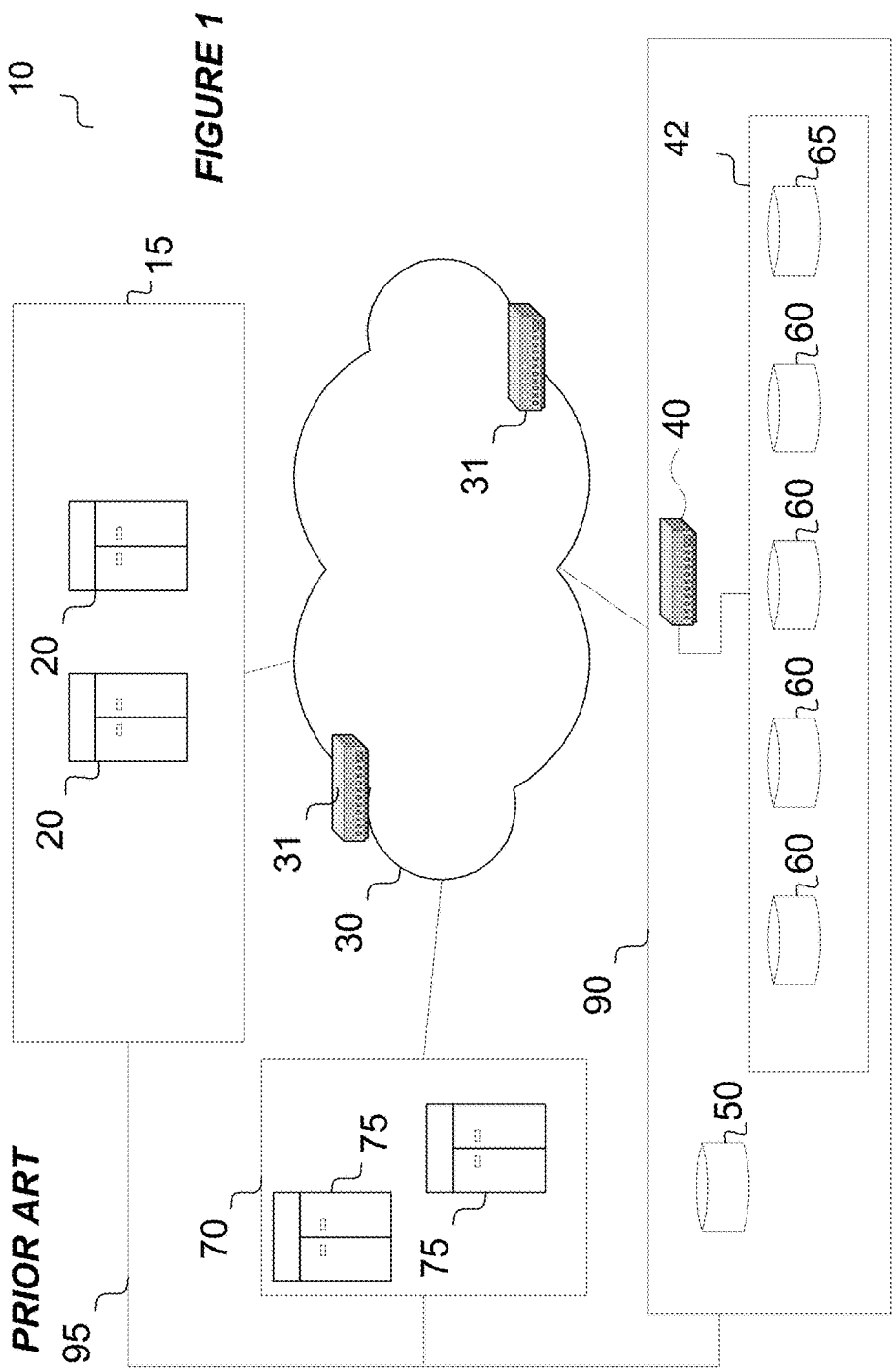
FIG. 1 is a block diagram depicting a data processing system, in accordance with the prior art, and in which an embodiment of the present invention may be implemented.

FIG. 1 is a block diagram depicting a data processing system 10, in accordance with the prior art, and in which an embodiment of the present invention may be implemented.

The illustrated data processing system 10 comprises a server node subsystem 15 having a set of server nodes 20, which are connectable through a network 30 to a back-end storage subsystem 90. The network 30 typically comprises network devices 31, for example switches, and cabling that connect the server node subsystem 15 to the hardware back-end storage subsystem 90. The storage subsystem 90 may comprise a variety of physical storage devices having, for example, a stand-alone Just a Bunch of Disks (JBOD) device 50, and a RAID array 42. The RAID array 42 comprises a plurality of storage devices 60, 65. The storage device 65 may be used to store a parity value associated with data stored on the other storage devices 60 in the RAID array 42. The parity storage device 65, typically, is not exclusively used to store a parity value, as in industry standard RAID implementations, parity is often rotated around the storage devices 60, 65 that comprise the RAID array 42. The storage devices 42, 50 may be presented to the server node subsystem 15 as a set of physical or logical storage volumes (not depicted). Typically the system 10 is managed by a management subsystem 70 comprising management servers 75, connectable to the server node subsystem 15, the storage subsystem 90, and the network devices 31 through the network 30 or through a separate Local Area Network (LAN) 95. Typically, a RAID Controller 40 controls the functionality of the RAID array 42, including data accesses and power controls to the individual storage devices 60, 65. Read and write commands may be sent to the storage subsystem 90 by a requester (not depicted) that may be an application program operable in the data processing system 10.

FIG. 2 is an exemplary RAID table 200 depicting information used in the data processing system 10 depicted in FIG. 1, in accordance with the prior art, and in which an embodiment of the present invention may be implemented. The table 200 depicts relationships between RAID arrays 42, storage devices 60, 65, and related information 206, 208. The table 200 comprises a plurality of columns 202, 204, 206, 208. The storage device column 202, comprises the identification numbers of the storage devices 50, 60, 65 in the storage subsystem 90. One storage device "id 1" is depicted in table cell 216. The array number column 204, comprises the RAID array identification numbers of the RAID arrays 42 in the storage subsystem 90. The RAID type column 206 comprises the RAID type of the RAID arrays 42 in the storage subsystem 90. The information column 208 comprises information on whether the storage device 50, 60, 65 is a used for data "D" 210, used as a redundant storage device 65 to store parity "P" 212, or used as either data or parity "DIP" 214.

To illustrate a use of the table 200, as an example: "array 1" is depicted as a RAID 4 array, comprising storage devices "id 1", "id 2", "id 3", and "id 4"; and, "array 2" is depicted as a RAID 1 array, comprising storage devices "id 5", and "id 6". Further, in "array 1", storage devices "id 1", "id 2", "id 3", are used solely for data, and storage devices "id 4" is always used for parity. In contrast, in "array 3", as a RAID 5 array, parity is rotated between writes. For example, during one write, storage devices "id 7" and "id 8" are used for data, and storage device "id 9" used for parity, but in a subsequent write, "id 8" and "id 9" are used for data, and "id 7" is used for parity. Storage devices "id 7", "id 8", and "id 9" are marked as D/P to depict that the storage devices 60, 65 may be used for either data or parity. Typically, for RAID 10, and RAID 4 parity is not rotated.

FIG. 3 is an exemplary availability table 300 depicting further information used in the data processing system 10 depicted in FIG. 1, in accordance with the prior art, and in which an embodiment of the present invention may be implemented. The availability table 300 depicts relationships between storage devices 60, 65, and related information 308. The availability table 300 comprises a plurality of columns 302, 308. The storage device column 302, comprises the identification numbers of the storage devices 50, 60, 65 in the storage subsystem 90. One storage device "id 1" is depicted in table cell 320. The availability column 308, comprises information on whether the storage device 50, 60, 65 is available "Y" 310, or not available "N" 312. As an example, cell 310 depicts that storage device "id 1" in cell 320 available. In contrast, cell 312 depicts that storage device "id 4" is not available.

The term "available", as used herein throughout the description and claims, is used to mean that the storage device is available for typical data access operations. An "availability message", as used herein throughout the description and claims, is construed as meaning a message indicating the availability or non-availability of a storage device 50, 60, 65.

It will be clear to one of ordinary skill in the art that the RAID table 200 and the availability table 300 are by way of example only, and may comprise more or less information than that depicted. Alternatively, the tables may be combined.

Figure 4:
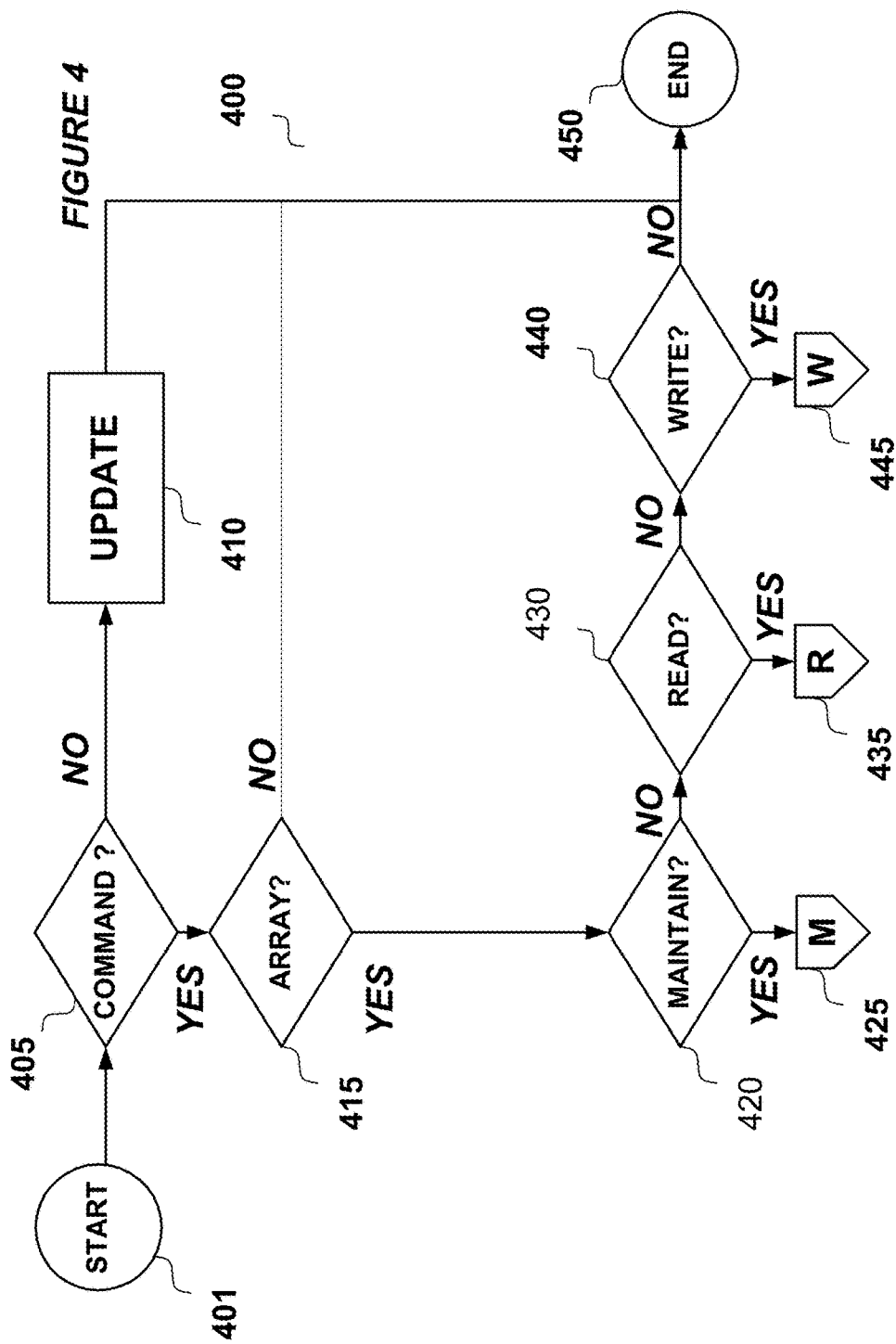
FIG. 4 is a high-level exemplary schematic flow diagram depicting a process for maintaining access times in a data processing system, in accordance with an embodiment of the present invention.
Figure 8:
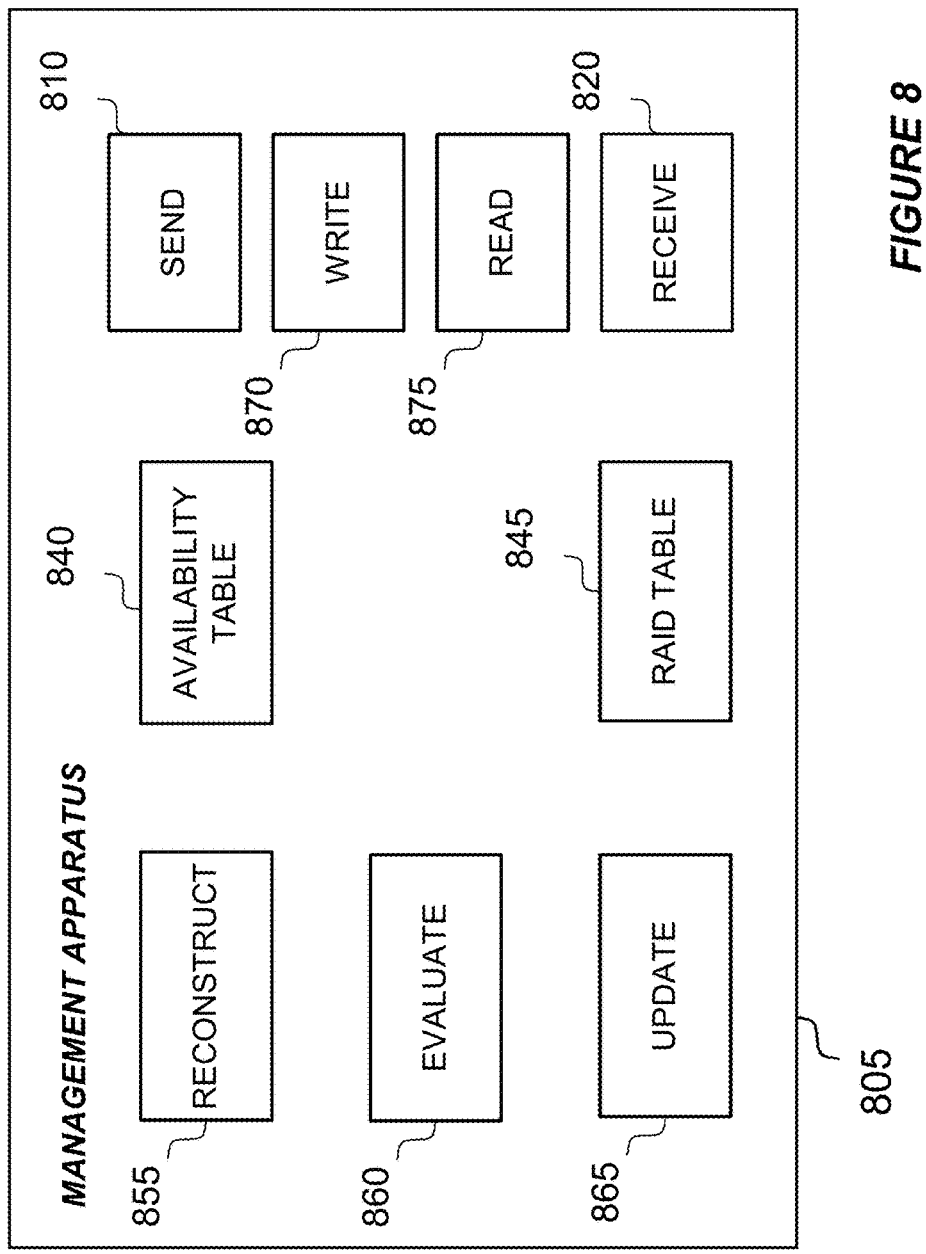
FIG. 8 is an exemplary block diagram depicting a management apparatus in which the present invention may be embodied.

FIG. 4, read in conjunction with FIGS. 1, 2, 3, and 8, is a high-level exemplary schematic flow diagram 400 depicting an embodiment of a process for maintaining access times in a data processing system 10. FIG. 8, is an exemplary block diagram depicting a management apparatus 805 in which the present invention may be embodied. Typically, the management apparatus of the present invention is, but is not restricted to, be, operable in a RAID controller 40.

The method starts at step 401. At step 405, the receive component 820 either receives a command (YES, 405) from one of the components in the data processing system 10, or receives an availability message (NO, 405) from a storage device 60, 65. At step 410, if the receive component 820 receives an availability message from a storage device 60, 65, the update component 865 updates the availability table 300 to indicate whether the storage device 60, 65 is available or not available.

The receive component 820 may receive an availability message from each storage device 60, 65 in the RAID array 42. A command may be a maintain command that indicates that the apparatus should instigate a maintenance method to power down the redundant storage device 60, 65 of the RAID array 42. Alternatively, a command may be a read or a write command, that indicates that a read or a write, respectively, should be carried out to the RAID array 42.

At step 415, if the receive component 820 receives a command, the evaluate component 860 evaluates the RAID table 200 to determine whether the storage devices 50, 60, 65 indicated in the command are members of a RAID array 42. If the storage devices 50, 60, 65 are not members of a RAID array 42 (NO, 415), the method ends.

However, if the storage devices 50, 60, 65 are members of a RAID array 42 (YES, 415), at step 420, the receive component 820 determines whether the command is a maintain command. If the command is a maintain command (YES, 420), the method continues at step 425 to the maintain method of FIG. 5. However, if the command is not a maintain command (NO, 420), at step 430, the receive component 820 determines whether the command is a read command. If the command is a read command (YES, 430), the method continues at step 435 to the read method of FIG.

6. However, if the command is not a read command (NO, 430), at step 440, the receive component 820 determines whether the command is a write command. If the command is a write command (YES, 440), the method continues at step 445 to the write method of FIG. 7. At step 450, if the command is not a write command (NO, 440), the method ends.

Figure 5:
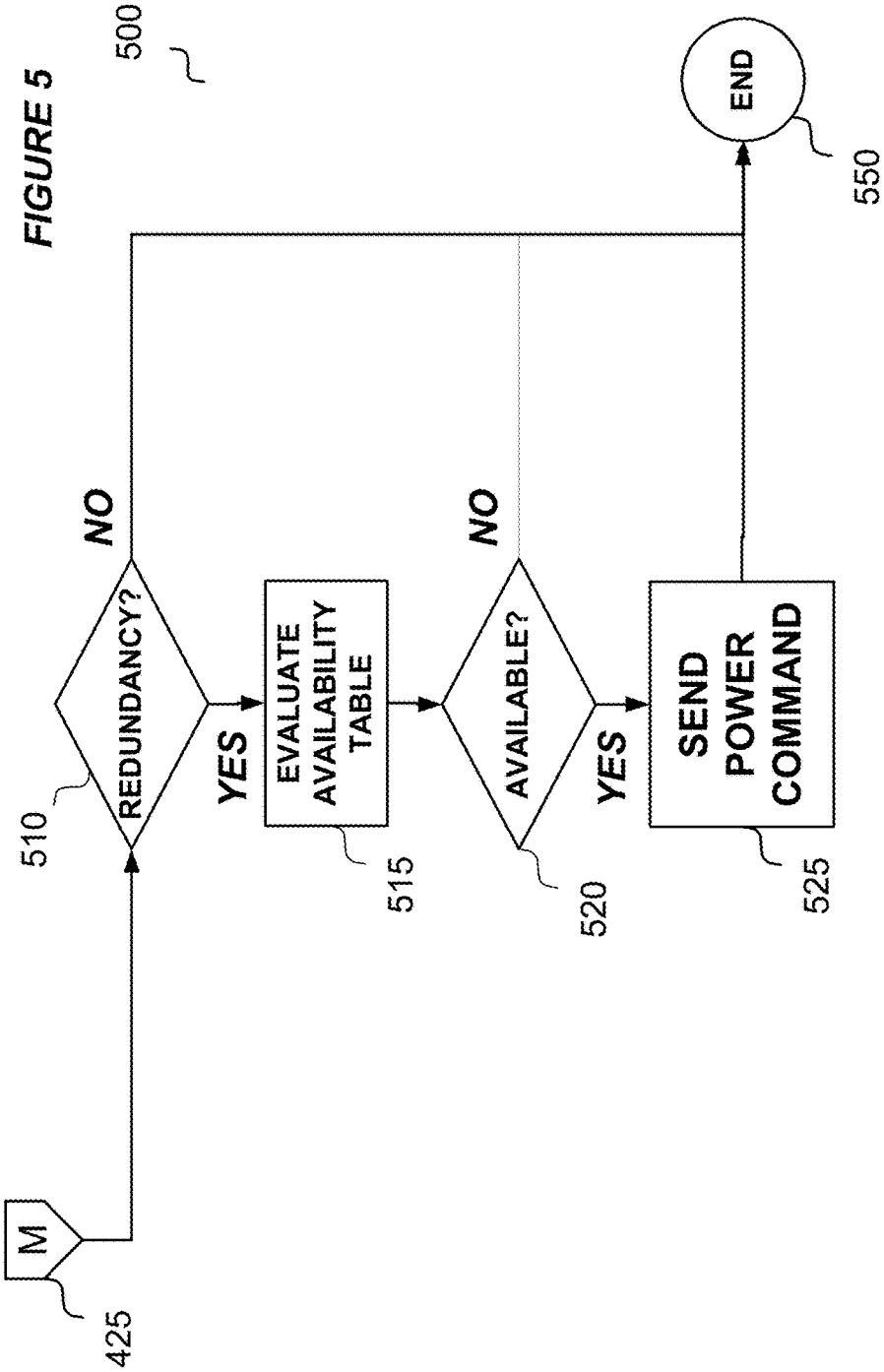
FIG. 5 is a high-level exemplary schematic flow diagram depicting a process for the maintain method started in FIG. 4, in accordance with an embodiment of the present invention.

FIG. 5, read in conjunction with FIGS. 1, 3, 4 and 8, is a high-level exemplary schematic flow diagram 500 depicting an embodiment of a process for the maintain method started in FIG. 4.

The maintain method starts at step 425. In response to receiving a maintain command, at step 510, the evaluate component 860 determines a storage device 60, 65 that may be "maintained" by powering down the storage device 60, 65. The storage device 60, 65 to maintain is determined by the evaluate component 860 evaluating usage patterns of the underlying RAID array 42. An example of a usage pattern, which will be used to illustrate the method, is that of selecting the parity storage device 65 as being the redundant storage device 65 in the RAID array 42. Alternatively, if the storage device 60, 65 is used for either storing data or parity, a scheme may be used to rotate power commands to the storage devices 60, 65 of the RAID array 42. The evaluate component 860 also determines whether the storage devices 60, 65 of the RAID array 42 indicated are data storage devices 60, parity storage devices 65, or either data or parity storage devices 60, 65.

If no determined storage devices 60 are redundant (NO, 510), the maintain method ends at step 550. If the evaluate component 860 determines that a redundant storage device 60, 65 does exist (YES, 510), at step 515, the evaluate component 860 evaluates the availability table 300, and at step 520 determines whether the redundant storage device 60, 65 is available. If the redundant storage device 60, 65 is not available (NO, 520), the method ends at step 550. If the evaluate component 860 determines that the redundant storage device 60, 65 is available (YES, 520), at step 525, the send component 810 sends a power off command to the redundant storage device 60, 65. However, if the evaluate component 810 determines that redundancy of the array 42 has already been lost, either due to an earlier power off command, or a storage device 60, 65 failure, a further power off command is not sent. The maintain method 500 ends at step 550. As a result of the maintain method 500, a storage device 60, 65 may send an availability message to the management apparatus.

In an alternative embodiment, if the RAID array 42 has a plurality of parity storage devices 65, a power-down command may be sent to the plurality of redundant storage devices 60, 65.

In an alternative embodiment, if usage patterns change, so that restoration of full redundancy is required, the maintain method is also operable to power on redundant storage devices 60, 65.

The power command is typically either a power down or a power up command. However, the power command may also be one of a plurality of different power management commands associated with storage devices 50, 60, 65. One example is a command to park the heads of a disk storage device, whereas another may spin the storage device 50, 60, 65 down. Typically, power control commands are initiated to appropriate storage devices 50, 60, 65 through a predefined application programming interface (API). Also typically, a maintain command may be sent to the management apparatus from a storage management/administration level of the data processing system 10.

Alternatively, the maintain command may be generated internally to the management apparatus, by the management apparatus assessing usage patterns and automatically powering down specific storage devices based on predefined thresholds of usage patterns set by a storage management/administration level. Alternatively, the maintain command may be generated automatically according to a predefined schedule.

Figure 6:
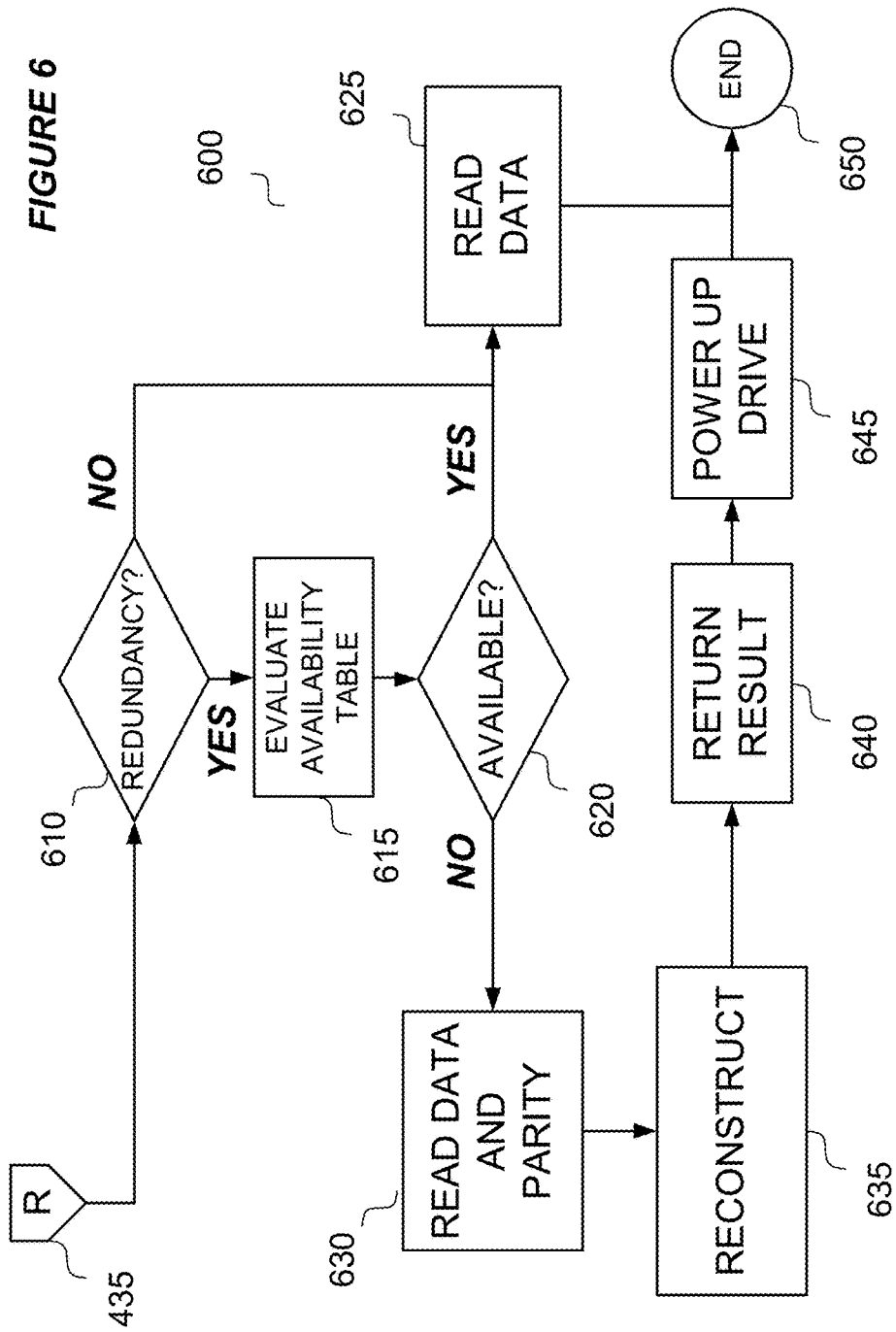
FIG. 6 is a high-level exemplary schematic flow diagram depicting a process for the read method started in FIG. 4 for reading data from a storage array, in accordance with an embodiment of the present invention.

FIG. 6, read in conjunction with FIGS. 1-4 and 8, is a high-level exemplary schematic flow diagram 600 depicting an embodiment of a process for the read method started in FIG. 4 for reading data from a storage array 42.

Read access to the storage devices 60, 65 does not cause an unavailable, or spun down storage device 60, 65 to be spun up, as data that resides on the spun down storage device 60, 65 may be reconstructed by the remaining storage devices 60, 65. Millisecond access times for reads may therefore be achieved.

The read method starts at step 435. A read command comprises the storage devices 60, 65 of the RAID array 42 at which the read command is directed. In response to receiving a read command, at step 610, the evaluate component 860 evaluates the RAID table 200 to determines whether the specified storage devices 60, 65 of the specified RAID array 42 are data storage devices 60, parity storage devices 65, or either data or parity storage devices 60, 65.

If no specified storage devices 60 are redundant (NO, 610), at step 625, data is read from the specified storage devices 60. If the evaluate component 860 determines that a redundant storage device 60, 65 does exist (YES, 610), at step 615, the evaluate component 860 evaluates the availability table 300, and at step 620 determines whether the storage devices 60, 65 are available. If all storage devices 60, 65 are available (YES, 620), data is read from the specified storage devices 60, 65.

If the evaluate component 860 determines that at least one storage device 60, 65 is not available (NO, 620), at step 630, the read component 875 reads data and parity from the available storage devices 60, 65. At step 635, the reconstruct component 855 reconstructs the data from the read data and read parity. At step 640, the reconstructed read data is returned to the requester of the data. At step 645, a power on command is sent to the storage device 60, 65 that was not available, so that if there is a subsequent read from the RAID array 42, all storage devices 60, 65 will be available. The read method 500 ends at step 650. As a result of the read method 600, a storage device 60, 65 may send an availability message to the management apparatus. In an alternative embodiment, step 645 is eliminated.

For a RAID 10, or RAID 4 array, where parity is not rotated, data is accessible without the need to reconstruct. For a RAID 5 array, if the storage device 60, 65 that stores parity is the storage device 60, 65 that is unavailable, then data is accessible with the need to reconstruct.

Figure 7:
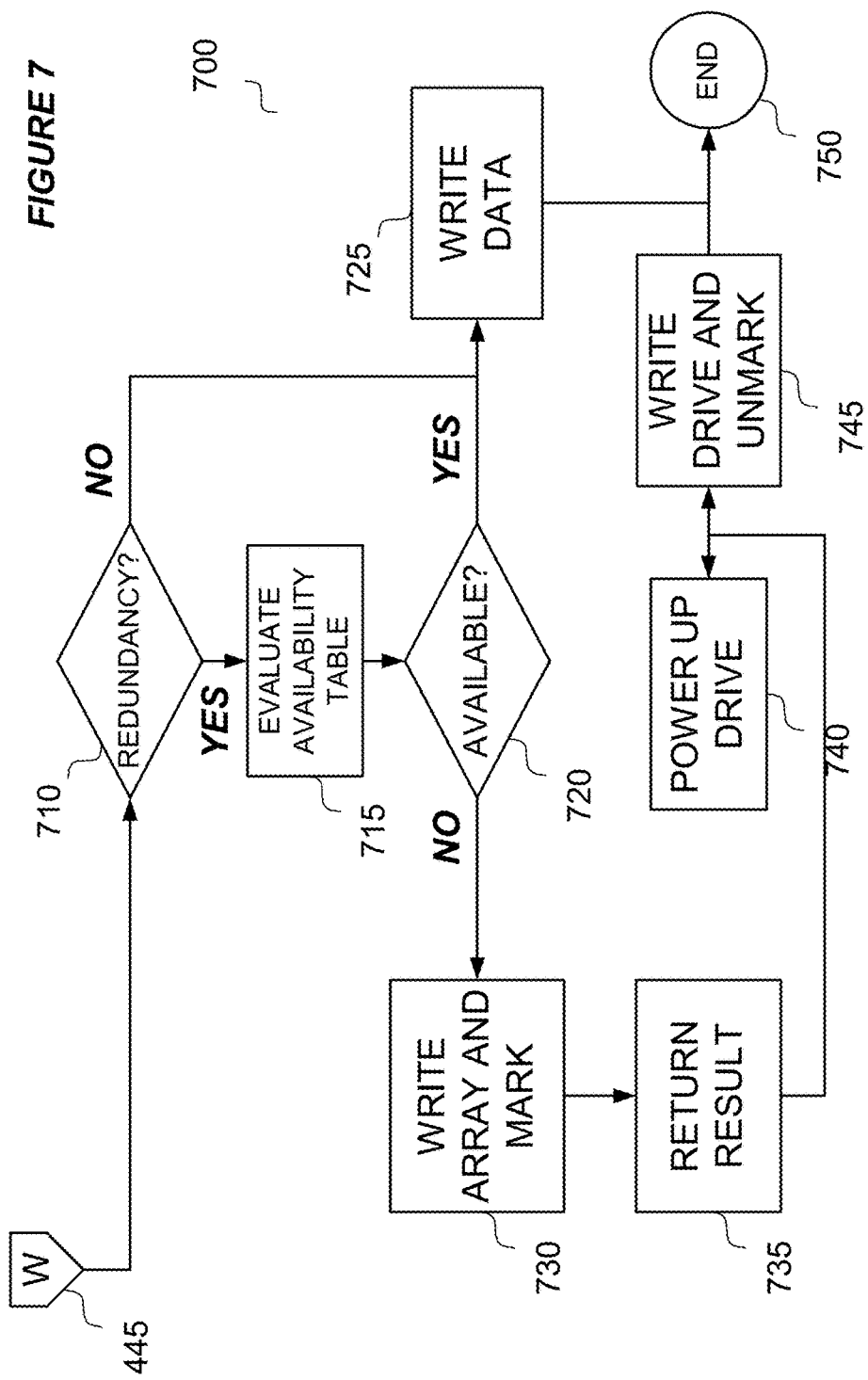
FIG. 7 is a high-level exemplary schematic flow diagram depicting a process for the write method started in FIG. 4 for writing data from a storage array, in accordance with an embodiment of the present invention.

FIG. 7, read in conjunction with FIGS. 1-4 and 8, is a high-level exemplary schematic flow diagram 700 depicting an embodiment of a process for the write method started in FIG. 4 for writing data from a storage array 42.

A RAID array 42 that has one storage device 60, 65 not available is called a "degraded array". Typically, for RAID 4, RAID 5 or RAID 10 arrays, writes are not made to degraded arrays, because those writes are not protected until writes are made to all storage devices 60, 65. If a write is made to a degraded array, there is an exposure to data loss, if a further storage device 60, 65 is lost. However, there are techniques that allow writes to proceed in RAID 5 systems such as "component in doubt", or "write journaling", that do allow writes to degraded arrays. These techniques are operable for temporary losses of storage devices 60, 65. A bitmap or a journal of writes is stored, so that the data may be written to the missing storage device 60, 65 when the lost storage device 60, 65 returns. However, should the storage device 60, 65 not return, the RAID array 42 remains exposed to data loss.

For RAID arrays 42 with a plurality of redundant storage devices 60, 65, for example in a RAID 6 array, writes are allowed if only one storage device 60, 65 is unavailable, as there is still a parity storage device 65. Therefore, write access times may be guaranteed without data loss if a storage device 60, 65 has been spun down.

For writes, various levels of access may be achieved depending on the strength of the underlying RAID algorithms.

The write method starts at step 445. A write command comprises the storage devices 60, 65 of the RAID array 42, that the write command is directed at.

In response to receiving a write command, at step 710, the evaluate component 860 evaluates the RAID table 200 to determine whether the specified storage devices 60, 65 of the specified RAID array 42 are data storage devices 60, parity storage devices 65, or either data or parity storage devices 60, 65.

If no specified storage devices 60 are redundant (NO, 710), at step 725, data is written to the specified storage devices 60. If the evaluate component 860 determines that a redundant storage device 60, 65 does exist (YES, 710), at step 715, the evaluate component 860 evaluates the availability table 300, and at step 720 determines whether the storage devices 60, 65 are available. If all storage devices 60, 65 are available (YES, 720), data is written to the specified storage devices 60, 65.

If the evaluate component 860 determines that at least one storage device 60, 65 is not available (NO, 720), at step 730, the write component 870 writes data and parity to the available storage devices 60, 65. However, as at least one of the storage devices 60, 65, is unavailable, the write to the unavailable storage device 60, 65 is not completed successfully. The write component 870 marks the stripe of data in persistent storage to indicate that the RAID array 42 is degraded. In an alternative embodiment, a known write journaling method can be used. At step 735, the requester of the write command is sent a message to confirm that the write was completed. At step 740, a power on command is sent to the unavailable storage device 60, 65. The previously unavailable storage device 60, 65 may send an availability message to the management apparatus. Once the previously unavailable storage device 60, 65 is available again, redundancy may be restored by writing data on the recently available storage device 60, 65. The data written may have been stored in a write journal in the RAID controller 42 write cache, or the data may be reconstructed from the data and parity previously successfully written. Once the data has been successfully been written to the recently available storage device 60, 65, the data is unmarked to indicate that the RAID array 42 is no longer degraded. Another advantage of powering up a storage device 60, 65 after a write command, is that the storage device 60, 65 is made available for subsequent writes. If subsequent writes do not occur, the maintain method 500 may be followed to power down the storage device 60, 65. The write method 700 ends at step 750.

FIGS. 4, 5, 6, and 7 are set forth as logical flow chart diagrams. As such, the depicted order and labelled steps are indicative of an embodiment of the presented method. Other steps and methods may be conceived that are equivalent in function, logic, or effect of one or more steps or portions thereof, of the illustrated method. Additionally the format and symbols employed are provided to explain the logical steps of the method and are understood not to limit the scope of the method.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be appreciated that the method and arrangement described above may also suitably be performed fully or partially in software running on one or more processors (not depicted in the Figures), and that the software may be provided in the form of one or more computer program elements carried on any suitable data-carrier (also not depicted in the Figures) such as a magnetic or optical disk or the like.

For the avoidance of doubt, the term "comprising", as used herein throughout the description and claims is not to be construed as meaning "consisting only of".

The invention claimed is:

1. A storage management apparatus for maintaining access times in a data processing system, wherein the data processing system comprises a plurality of storage devices, the apparatus comprising:

an evaluate component, responsive to receiving a read or write command, for evaluating a plurality of first relationships between the plurality of storage devices and a plurality of first values, wherein each of the first values indicates whether a related storage device is a redundant storage device;

a send component for sending a power message to one or more of the plurality of storage devices, in response to the evaluate component determining that one or more of the plurality of storage devices is a redundant storage device; and an update component, in response to receiving an availability message, the availability message indicating whether the redundant storage device is available, for updating a second relationship between the redundant storage device and a plurality of second values, wherein each of the second values indicates whether a related redundant storage device is available, wherein, when the command comprises the read command, the evaluate component, in response to the read command, evaluates a plurality of the second values associated with the plurality of storage devices, and wherein the apparatus further comprises:

a read component, in response to the evaluate component determining that one or more of the plurality of storage devices is not available, for reading data from the plurality of storage devices; and a reconstruct component for reconstructing data from the plurality of storage devices, or wherein, when the command comprises the write command, the evaluate component, in response to the write command, determines a plurality of the second values associated with the plurality of storage devices, and wherein the apparatus further comprises a write component, in response to the evaluate component determining that one or more of the plurality of storage devices is not available, for writing data to the plurality of storage devices.

2. The apparatus of claim 1, wherein the power message indicates a power up command.

3. A method for maintaining access times in a data processing system, wherein the data processing system comprises a plurality of storage devices, the method comprising:

evaluating, in response to a read or write command, a plurality of first relationships between the plurality of storage devices and a plurality of first values, wherein each of the first values indicates whether a related storage device is a redundant storage device;

sending a power message to one or more of the plurality of storage devices, in response to the evaluate component determining that one or more of the plurality of storage devices is a redundant storage device; and in response to the receive component receiving an availability message, the availability message indicating whether the redundant storage device is available, updating a second relationship between the redundant storage device and a plurality of second values, wherein each of the second values indicates whether a related redundant storage device is available, wherein, when the command comprises the read command, the method further comprises:

in response to the read command, evaluating a plurality of the second values associated with the plurality of storage devices;

in response to the evaluate component determining that one or more of the plurality of storage devices is not available, reading data from the plurality of storage devices; and reconstructing data from the plurality of storage devices, or wherein, when the command comprises the write command, the method further comprises:

in response to the write command, determining a plurality of the second values associated with the plurality of storage devices; and in response to the evaluate component determining that one or more of the plurality of storage devices is not available, writing data to the plurality of storage devices.

4. The method of claim 3, wherein the power message indicates a power up command.

5. A computer program loadable into an internal memory of a digital computer, comprising software code portions for performing, when the program is run on a computer, to carry out the method as claimed in claim 3.

6. A data processing system comprising:

a storage system including a plurality of storage devices;

at least one server for accessing the storage system; and a storage management apparatus for maintaining access times of the storage system, the storage management system comprising:

an evaluate component, responsive to receiving a read or write command, for evaluating a plurality of first relationships between the plurality of storage devices and a plurality of first values, wherein each of the first values indicates whether a related storage device is a redundant storage device;

a send component for sending a power message to one or more of the plurality of storage devices, in response to the evaluate component determining that one or more of the plurality of storage devices is a redundant storage device; and an update component, in response to the receive component receiving an availability message, the availability message indicating whether the redundant storage device is available, for updating a second relationship between the redundant storage device and a plurality of second values, wherein each of the second values indicates whether a related redundant storage device is available, wherein, when the command comprises the read command, the evaluate component, in response to the read command, evaluates a plurality of the second values associated with the plurality of storage devices, and wherein the storage management apparatus further comprises:

a read component, in response to the evaluate component determining that one or more of the plurality of storage devices is not available, for reading data from the plurality of storage devices; and a reconstruct component for reconstructing data from the plurality of storage devices, or wherein, when the command comprises the write command, the evaluate component, in response to the write command, determines a plurality of the second values associated with the plurality of storage devices, and wherein the storage management apparatus further comprises a write component, in response to the evaluate component determining that one or more of the plurality of storage devices is not available, for writing data to the plurality of storage devices.

7. The data processing system of claim 6, wherein the power message indicates a power up command.

* * * * *